(12) United States Patent
Suzuki

(10) Patent No.: US 10,999,178 B2
(45) Date of Patent: May 4, 2021

(54) INFORMATION PROCESSING APPARATUS AND INFORMATION PROCESSING SYSTEM

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/715,522

(22) Filed: Dec. 16, 2019

(65) Prior Publication Data

US 2020/0220797 A1 Jul. 9, 2020

(30) Foreign Application Priority Data

Jan. 9, 2019 (JP) .............................. JP2019-001762

(51) Int. Cl.
*H04L 12/26* (2006.01)
*H04L 12/18* (2006.01)
*H04L 29/12* (2006.01)
*H04L 12/46* (2006.01)

(52) U.S. Cl.
CPC .......... *H04L 43/10* (2013.01); *H04L 12/1886* (2013.01); *H04L 12/4679* (2013.01); *H04L 61/2069* (2013.01); *H04L 61/6022* (2013.01)

(58) Field of Classification Search
CPC ....... H04L 49/254; H04L 49/40; H04L 47/10; H04L 49/205
See application file for complete search history.

(56) References Cited

U.S. PATENT DOCUMENTS

| | | | |
|---|---|---|---|
| 6,690,668 B1 * | 2/2004 | Szczepanek | H04L 49/351 370/392 |
| 2013/0148666 A1 | 6/2013 | Shimonishi et al. | |

FOREIGN PATENT DOCUMENTS

| | | |
|---|---|---|
| JP | 2013-537769 | 10/2013 |
| JP | 2017-46211 | 3/2017 |

* cited by examiner

*Primary Examiner* — Chandrahas B Patel
(74) *Attorney, Agent, or Firm* — Staas & Halsey LLP

(57) ABSTRACT

An information processing apparatus, when a mirroring setting request of a virtual machine is received, transmits by broadcasting a detection packet to detect a monitoring node, when a response packet to respond to the detection packet is received from the monitoring node, determines a state of whether a reception port is a local port or an uplink port, based on a node identifier of the monitoring node, node identifier information, and state information, determines a connection relationship over a network between the information processing apparatus and the monitoring node, based on a presence/absence of the response packet and the determined state of the reception port, and performs a setting for transmitting a mirror packet obtained by copying a communication packet of the virtual machine to the monitoring node, for at least one switch of a plurality of switches, based on the determined connection relationship.

6 Claims, 12 Drawing Sheets

INFORMATION PROCESSING APPARATUS AND INFORMATION PROCESSING SYSTEM

CROSS-REFERENCE TO RELATED APPLICATION

This application is based upon and claims the benefit of the prior Japanese Patent Application No. 2019-001762, filed on Jan. 9, 2019, the entire contents of which are incorporated herein by reference.

FIELD

The embodiments discussed herein are related to an information processing apparatus, an information processing system, and a setting program.

BACKGROUND

In a computer network, the communication status may be grasped by capturing a packet communicated via the network. To capture a packet, for example, a port mirroring function of a switch may be used. The port mirroring refers to outputting a copy of a packet (mirror packet) input/output to/from a port to which a monitoring target computer is connected, to a port to which a monitoring computer is connected.

Further, in a computer network, since the virtualization of computer resources has been progressed, the monitoring target computer may be a virtual machine (VM). When a packet input/output to/from a VM is captured, a mirror packet may be transmitted to another monitoring VM, for example, by performing a port mirroring setting in a virtual switch.

In addition, a plurality of VMs operating on one physical machine conduct a communication via a network interface card (NIC) mounted on the physical machine. An NIC may generate a plurality of virtual NICs therein. The virtualization of functions within the NIC may be implemented using, for example, an SR-IOV (Single Root I/O Virtualization) technique. A virtual NIC may be called a VF (Virtual Function). When the NIC is provided with a plurality of VFs, for example, one VF is allocated to each of the plurality of VMs. When a VF is allocated to each VM, each VM may operate the VF in the NIC without going through a hypervisor to conduct a communication. As a result, an occurrence of overhead due to the virtualization is suppressed so that a high-speed communication may be conducted.

When a monitoring target VM conducts a communication without going through a hypervisor, mirroring of a packet input/output to/from the VM may not be performed by a virtual switch, and is performed using the function of a physical switch on the network. At this time, the setting contents of a switch for transmitting a mirror packet to a VM of a transmission destination depend on the positional relationship between the monitoring target VM and the monitoring VM. For example, when the monitoring target VM and the monitoring VM are directly connected to a common switch, an administrator may perform the port mirroring setting for the switch. Meanwhile, when the monitoring target VM and the monitoring VM are connected via a plurality of apparatuses such as switches and routers (including layer 3 switches), the administrator needs to perform relatively more complicated settings. For example, the administrator performs a setting of VLAN (Virtual Local Area Network), a setting of packet encapsulation or the like, for the switch. The VLAN is a technique for constructing a virtual LAN segment.

As a network management technique, for example, there has been proposed a communication system capable of performing a packet transmission along an intended path even in an environment in which nodes represented by a layer 2 switch (L2SW) and nodes represented by an open flow switch coexist. There has also been proposed a communication device that detects the type of a virtual network to which a connection is performed, and improves the connectivity to the virtual network.

Related techniques are disclosed in, for example, Japanese National Publication of International Patent Application No. 2013-537769 and Japanese Laid-Open Patent Publication No. 2017-046211.

SUMMARY

According to an aspect of the embodiments, an information processing apparatus includes a memory configured to store, for each port of a switch of a plurality of switches included in a network, node identifier information to indicate a node identifier assigned to each apparatus of a plurality of apparatuses coupled via the port and state information to indicate a state of whether the port is a local port or an uplink port, and a processor coupled to the memory and the processor configured to, when a mirroring setting request for a communication packet of a virtual machine that operates in the information processing apparatus is received, transmit by broadcasting a detection packet to detect a monitoring node apparatus that includes a packet monitoring function, when a response packet to respond to the detection packet is received from the monitoring node apparatus, determine a state of whether a reception port that receives the response packet in the switch is a local port or an uplink port, based on the node identifier of the monitoring node apparatus, the node identifier information, and the state information, determine a connection relationship over the network between the information processing apparatus and the monitoring node apparatus, based on a presence/absence of the response packet and the determined state of the reception port, and perform a setting for transmitting a mirror packet obtained by copying the communication packet of the virtual machine to the monitoring node apparatus, for at least one switch of the plurality of switches, based on the determined connection relationship.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

While the setting contents of a switch for transmitting a mirror packet to a VM of a transmission destination depend on the positional relationship between the monitoring target VM and the monitoring VM, it is difficult for the administrator to always grasp the positional relationship between VMs. For example, when a VM is generated, a virtualization manager automatically determines an appropriate physical machine at that time and generates a VM on the physical machine. In addition, the VM may move to another physical machine by migration, for reasons such as the system maintenance and the equalization of the load of the physical machine. Thus, the administrator may not grasp on which physical machine each VM is currently operating, and further, may not know the positional relationship between the monitoring target VM and the monitoring VM. As a result, it becomes difficult for the administrator to perform the transmission setting of a mirror packet in a switch.

Hereinafter, embodiments of a technique capable of easily performing the transmission setting of a mirror packet will be described with reference to the drawings. In addition, the embodiments may be appropriately combined with each other within the scope that does not cause any inconsistency.

First Embodiment

First, a first embodiment will be described. The first embodiment relates to an information processing system that is capable of easily performing the transmission setting of a mirror packet.

Figure 1:
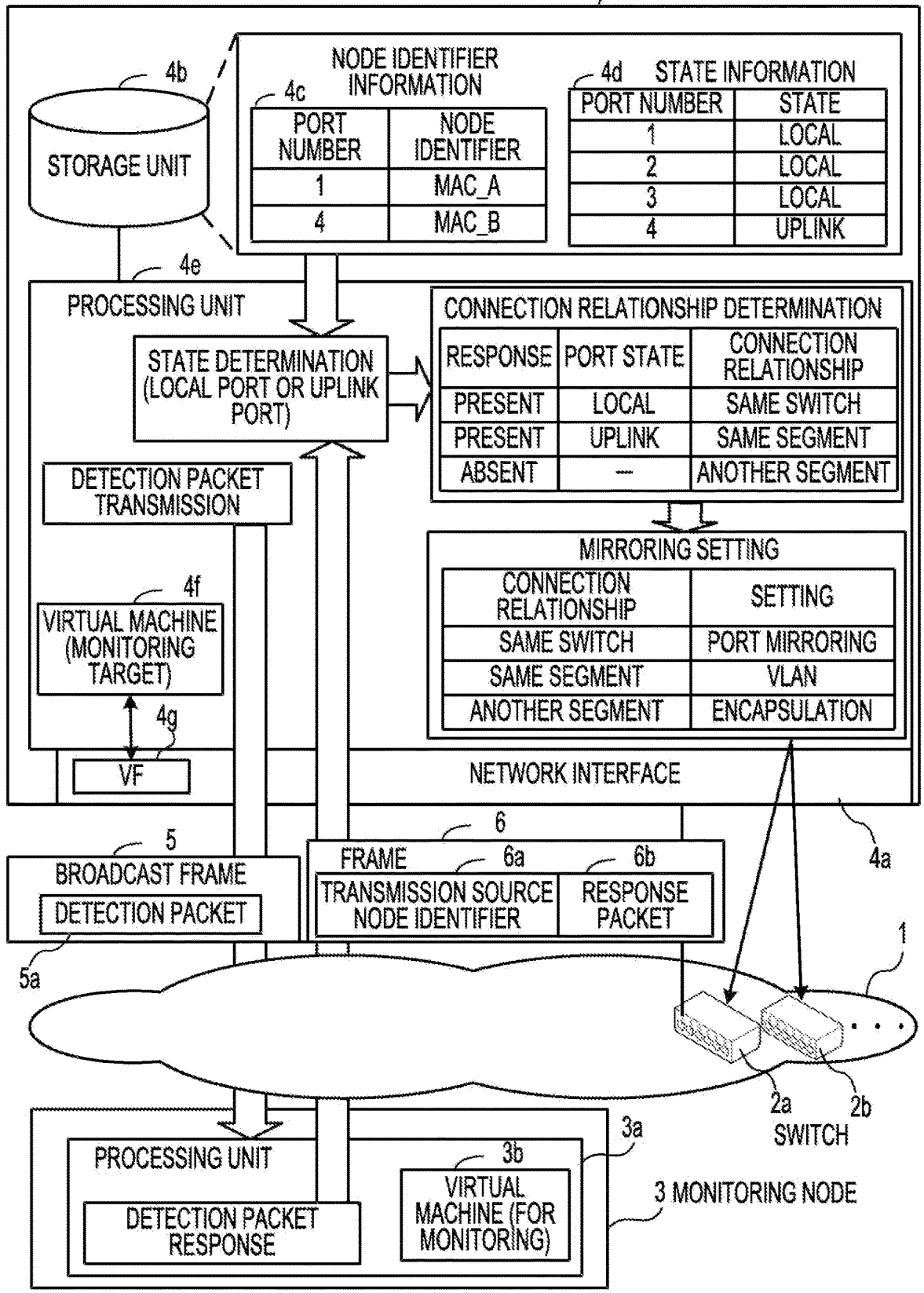
FIG. 1 is a view illustrating an example of a mirror packet transmission setting method according to a first embodiment.

FIG. 1 is a view illustrating an example of a method of the transmission setting of a mirror packet according to the first embodiment. FIG. 1 illustrates an example in which the method of the transmission setting of a mirror packet in switches 2a, 2b, . . . within a network 1 is performed by a monitoring node (monitoring node apparatus) 3 and an information processing apparatus 4 which are connected to the network 1. Each of the monitoring node 3 and the information processing apparatus 4 is able to perform the method of the transmission setting of a mirror packet by executing a program describing a procedure of a process performed by each apparatus for the transmission setting of a mirror packet.

In order to implement the method of the transmission setting of a mirror packet, the monitoring node 3 includes a processing unit 3a, and the information processing apparatus 4 includes a network interface 4a, a storage unit 4b, and a processing unit 4e. The processing unit 3a of the monitoring node 3 is, for example, a processor or an arithmetic circuit included in the monitoring node 3. The storage unit 4b of the information processing apparatus 4 is, for example, a memory or a storage device included in the information processing apparatus 4. The processing unit 4e of the information processing apparatus 4 is, for example, a processor or an arithmetic circuit included in the information processing apparatus 4.

The monitoring node 3 has a function of monitoring a communication packet on the network 1, and when a detection packet 5a for detecting the node having the monitoring function is received, the monitoring node 3 transmits a response packet 6b to the detection packet 5a. For example, the processing unit 3a of the monitoring node 3 executes a virtual machine 3b for monitoring a communication packet.

The processing unit 4e of the information processing apparatus 4 executes a virtual machine 4f which is a monitoring target. Further, a VF 4g that functions as a virtual network interface is provided in the network interface 4a. The virtual machine 4f conducts a communication via the network 1 by directly controlling the VF 4g without using a management function of a hypervisor or the like of the processing unit 4e.

The storage unit 4b stores node identifier information 4c and state information 4d. The node identifier information 4c indicates a node identifier assigned to an apparatus connected via each port of the switch 2a. The node identifier is, for example, a MAC (Media Access Control address) address of a communication apparatus. The state information 4d indicates a state of whether each port is a local port or an uplink port.

When a communication packet input/output to/from the virtual machine 4f is monitored, a system administrator inputs a mirroring setting request for the communication packet of the virtual machine 4f operating on the own apparatus 4, to the information processing apparatus 4. When the mirroring setting request is received, the processing unit 4e transmits the detection packet 5a for detecting the monitoring node 3 having the packet monitoring function by broadcast via the network interface 4a. For example, the detection packet 5a is transmitted by a broadcast frame 5. The broadcast frame 5 is transmitted to each apparatus within the same segment as that of the information processing apparatus 4.

When the monitoring node 3 is connected within the same segment as that of the information processing apparatus 4, the broadcast frame 5 reaches the monitoring node 3. When the monitoring node 3 is connected within a different segment from that of the information processing apparatus 4, the broadcast frame 5 does not reach the monitoring node 3.

When the detection packet 5a transmitted by the broadcast frame 5 is received, the processing unit 3a of the monitoring node 3 responds to the detection packet 5a. For example, the processing unit 3a transmits a response packet 6b to the information processing apparatus 4 that is the transmission source of the detection packet 5a. A frame 6 for the transmission of the response packet 6b includes a node identifier of the monitoring node 3 as a transmission source node identifier 6a.

When the frame 6 including the response packet 6b to the detection packet 5a is transmitted from the monitoring node 3, the processing unit 4e of the information processing apparatus 4 receives the response packet 6b transmitted by the frame 6. When the response packet 6b is received, the processing unit 4e determines whether a reception port of the response packet 6b in the switch 2a is a local port or an uplink port, based on the node identifier of the monitoring node 3, the node identifier information 4c, and the state information 4d. For example, the processing unit 4e refers to the node identifier information 4c to acquire a port number corresponding to the transmission source node identifier 6a of the response packet 6b. Next, the processing unit 4e refers to the state information 4d to acquire a port state corresponding to the acquired port number.

The processing unit 4e determines a connection relationship on the network 1 between the own apparatus and the monitoring node 3, based on the presence/absence of the response packet 6b and the state of the reception port. For example, when the response packet 6b is received and the reception port is a local port, the processing unit 4e determines that the monitoring node 3 is connected to the same switch 2a as that of the information processing apparatus 4. Further, when the response packet 6b is received and the reception port is an uplink port, the processing unit 4e determines that the monitoring node 3 is connected within the same segment as that of the information processing apparatus 4 via two or more switches. Furthermore, when the response packet 6b may not be received, the processing unit 4e determines that the monitoring node 3 is connected via a router.

Based on the determined connection relationship, the processing unit 4e performs the setting for transmitting a mirror packet obtained by copying the communication packet of the virtual machine 4f to the monitoring node 3, for at least a portion of the plurality of switches 2a, 2b, . . . . For example, when it is determined that the monitoring node 3 is connected to the same switch, the processing unit 4e performs a setting of port mirroring in the switch 2a connected to the network interface 4a. In addition, when it is determined that the monitoring node 3 is connected to the same segment via two or more switches, the processing unit 4e performs a setting of mirroring by VLAN in the switch 2a connected to the network interface 4a and a switch to which the monitoring node 3 is connected. Further, when it is determined that the monitoring node 3 is connected to another segment, the processing unit 4e performs a setting to encapsulate and transmit the mirror packet.

In this way, the information processing apparatus 4 may automatically recognize the connection relationship with the monitoring node 3 and perform an appropriate mirroring setting for a switch according to the connection relationship. As a result, the mirroring setting is facilitated, and at the same time, a load on the switch may be suppressed. For example, when the connection relationship is ignored and the transmission setting of a mirror packet by encapsulation is performed in all cases, the load of the switch for transmitting mirror packets becomes excessive. In the meantime, when the information processing apparatus 4 and the monitoring node 3 are connected to the same switch, the processing unit 4e performs the transmission setting of a mirror packet by port mirroring for the switch. Since the port mirroring may be implemented by an electronic circuit in the switch, the load of the switch for packet mirroring becomes smaller than that for encapsulation. Similarly, when the information processing apparatus 4 and the monitoring node 3 are connected to the same segment, the processing unit 4e performs the transmission setting of a mirror packet by VLAN. The management of packets by VLAN is simpler than the packet encapsulation, and the load of the switch for packet mirroring is reduced.

Second Embodiment

Figure 2:
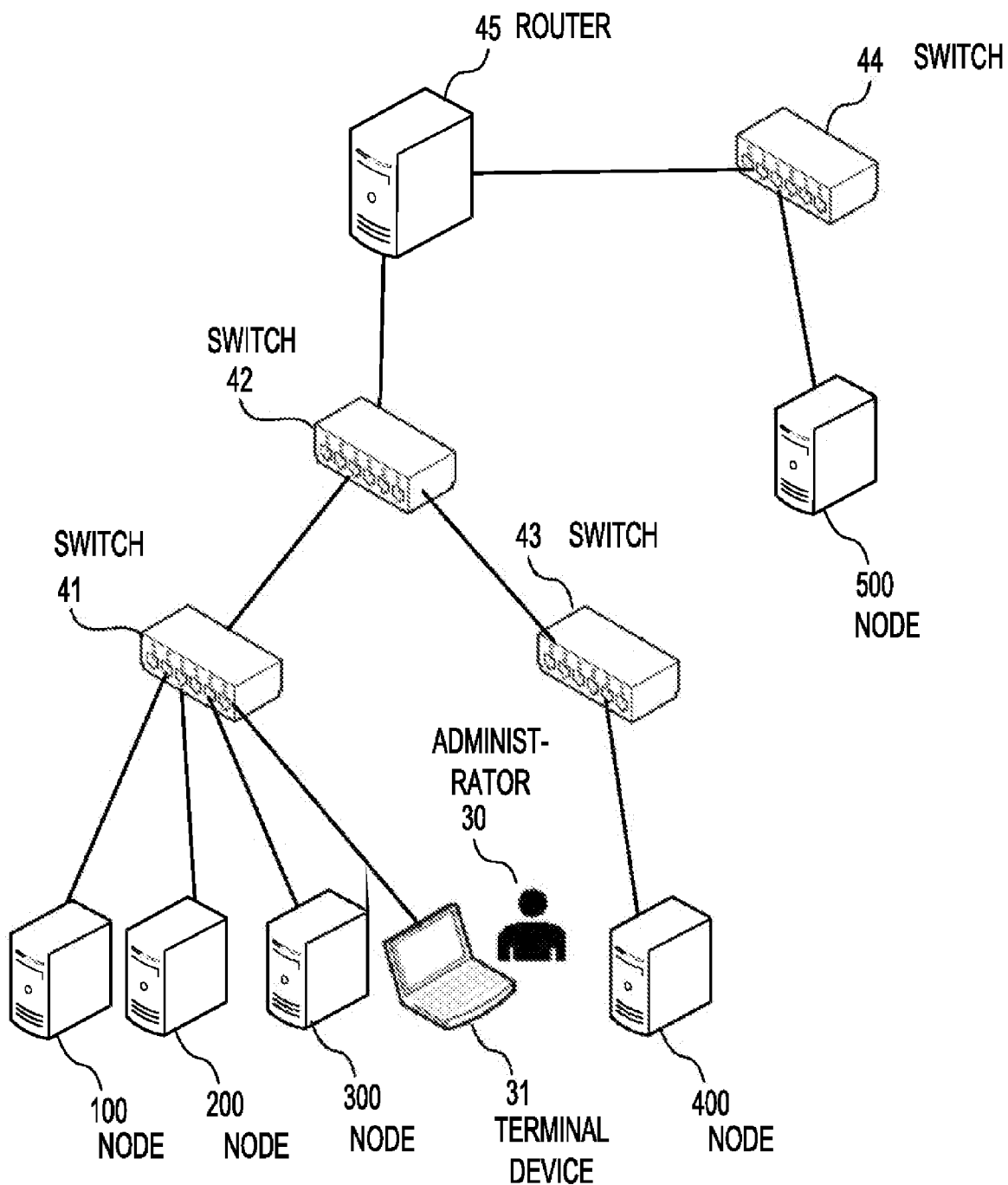
FIG. 2 is a view illustrating an example of a system configuration according to a second embodiment.

Next, a second embodiment will be described. FIG. 2 is a view illustrating an example of a system configuration according to a second embodiment. For example, a plurality of nodes 100, 200, 300, 400, and 500 and a terminal device 31 are connected to a computer network via switches 41 to 44 and a router 45. In the example of FIG. 2, the nodes 100, 200, and 300 and the terminal device 31 are connected to the switch 41. The node 400 is connected to the switch 43. The node 500 is connected to the switch 44.

The switches 41 to 43 are connected in cascade. The cascade connection is a connection form in which the plurality of switches 41 to 43 are connected to each other in a hierarchical manner. By cascading the plurality of switches 41 to 43, the number of apparatuses accommodated in the network may be increased. In the example of FIG. 2, the switches 41 and 43 are connected below the switch 42.

In the upper switch 42, a cable for connection to the lower switches 41 and 43 is connected to a local port. Meanwhile, in the lower switches 41 and 43, a cable for connection to the upper switch 42 is connected to an uplink port. The local port is a communication port for connecting apparatuses such as the nodes 100, 200, 300, 400, and 500, the router 45 and the terminal device 31. The uplink port is a communication port for connection to an upper switch.

Apparatuses connected to the cascade-connected switches 41 to 43 belong to the same segment on the network. The connection between apparatuses within the same segment may be referred to as an L2 connection. Meanwhile, the switches 42 and 44 are connected to each other via the router 45. In this case, apparatuses connected to the switches 41 to 43 and apparatuses connected to the switch 44 belong to different segments. The connection between apparatuses via the router 45 or an L3 switch may be referred to as an L3 connection.

In this computer network, for example, an administrator 30 may use the terminal device 31 to generate a VM for monitoring a VM communication in any nodes. At this time, the administrator 30 inputs a setting instruction for the switches 41 to 43, such that a copy of a packet (mirror packet) input/output to/from a monitoring target VM is transmitted to a monitoring VM. When there is an input of a mirror packet transmission instruction from the administrator 30, the nodes 100, 200, 300, 400, and 500 operate in cooperation with each other to perform the setting for the switches 41 to 44 such that mirror packets are transmitted according to the instruction.

Figure 3:
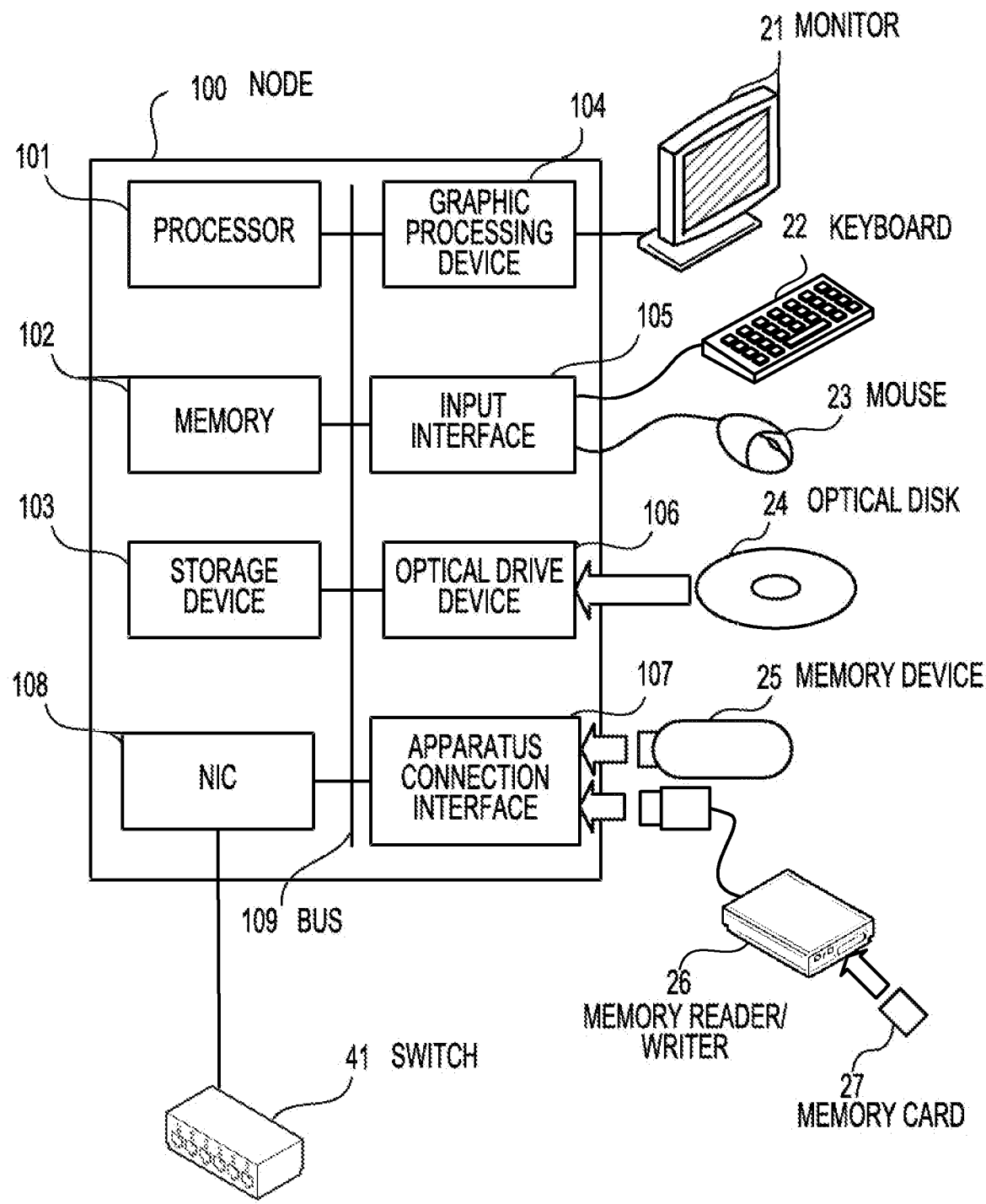
FIG. 3 is a view illustrating an example of a hardware configuration of a node.

FIG. 3 is a view illustrating an example of a hardware configuration of a node. The node 100 is entirely controlled by a processor 101. A memory 102 and a plurality of peripheral devices are connected to the processor 101 via a bus 109. The processor 101 may be a multiprocessor. The processor 101 is, for example, a CPU (Central Processing Unit), an MPU (Micro Processing Unit) or a DSP (Digital Signal Processor). At least a portion of functions implemented in the manner that the processor 101 executes programs may be implemented by an electronic circuit such as an ASIC (Application Specific Integrated Circuit) or a PLD (Programmable Logic Device).

The memory 102 is used as a main storage device of the node 100. The memory 102 temporarily stores at least a portion of an OS (Operating System) program and application programs to be executed by the processor 101. Further, the memory 102 stores various data to be used for processing by the processor 101. An example of the memory 102 may include a volatile semiconductor storage device such as a RAM (Random Access Memory).

The peripheral devices connected to the bus 109 include a storage device 103, a graphic processing device 104, an input interface 105, an optical drive device 106, an apparatus connection interface 107, and an NIC 108.

The storage device 103 writes/reads data electrically or magnetically in/from a built-in recording medium. The storage device 103 is used as an auxiliary storage device of a computer. The storage device 103 stores an OS program, application programs, and various data. In addition, an example of the storage device 103 may include an HDD (Hard Disk Drive) or an SSD (Solid State Drive).

A monitor 21 is connected to the graphic processing device 104. The graphic processing device 104 displays an image on the screen of the monitor 21 according to an instruction from the processor 101. Examples of the monitor 21 may include a display device using organic EL (Electro Luminescence), a liquid crystal display device, etc.

A keyboard 22 and a mouse 23 are connected to the input interface 105. The input interface 105 transmits a signal sent from the keyboard 22 or the mouse 23, to the processor 101. In addition, the mouse 23 is an example of a pointing device, and other pointing devices may be used. As for other pointing devices, there are a touch panel, a tablet, a touch pad, a trackball, etc.

The optical drive device 106 reads data recorded on an optical disk 24 using laser light or the like. The optical disk 24 is a portable recording medium on which data are recorded such that the data is readable by reflection of light. Examples of the optical disk 24 may include a DVD (Digital Versatile Disc), a DVD-RAM, a CD-ROM (Compact Disc Read Only Memory), a CD-R (Recordable)/RW (ReWritable), etc.

The apparatus connection interface 107 is a communication interface for connecting peripheral devices to the node 100. For example, a memory device 25 or a memory reader/writer 26 may be connected to the apparatus connection interface 107. The memory device 25 is a recording medium equipped with a communication function with the apparatus connection interface 107. The memory reader/writer 26 is a device that writes data in a memory card 27 or reads data from the memory card 27. The memory card 27 is a card type recording medium.

The NIC 108 is connected to the switch 41. The NIC 108 exchanges data with the other nodes 200, 300, 400, and 500 or the terminal device 31 via the switch 41. Further, the NIC 108 has a function of implementing SR-IOV and is able to generate a plurality of virtual NICs (VFs) therein.

The node 100 may implement the processing functions of the second embodiment with the hardware described above. The other nodes 200, 300, 400, and 500 and the terminal device 31 may also be implemented by the same hardware as that of the node 100. Further, the monitoring node 3 and the information processing apparatus 4 described in the first embodiment may also be implemented by the same hardware as that of the node 100.

The node 100 implements the processing functions of the second embodiment, for example, by executing a program recorded on a computer-readable recording medium. The program describing the processing contents to be executed by the node 100 may be recorded in various recording media. For example, the program to be executed by the node 100 may be stored in the storage device 103. The processor 101 loads at least a portion of the program in the storage device 103 into the memory 102 and executes the program. The program to be executed by the node 100 may also be recorded in a portable recording medium such as the optical disk 24, the memory device 25 or the memory card 27. The program stored in the portable recording medium may be executed after being installed in the storage device 103, for example, under control of the processor 101. In addition, the processor 101 may also read and execute the program directly from the portable recording medium. Similarly to the node 100, the nodes 200, 300, 400, and 500 and the terminal device 31 also implement the processing functions of the second embodiment by executing the program recorded on the computer-readable recording medium.

As described above, the NIC included in each of the nodes 100, 200, 300, 400, and 500 is able to generate a VF therein. In this case, the VM operating on each of the nodes 100, 200, 300, 400, and 500 operates the VF directly without going through the hypervisor of each of the nodes 100, 200, 300, 400, and 500, and conducts a communication via a network. Since the VM conducts a communication without going through the hypervisor of each of the nodes 100, 200, 300, 400, and 500, a packet capturing using a function provided on the hypervisor (e.g., a virtual switch) may not be performed. Therefore, when capturing of a packet input/output to/from a specific VM is performed, the administrator 30 performs the packet mirroring setting for the switches 41 to 44.

Figure 4:
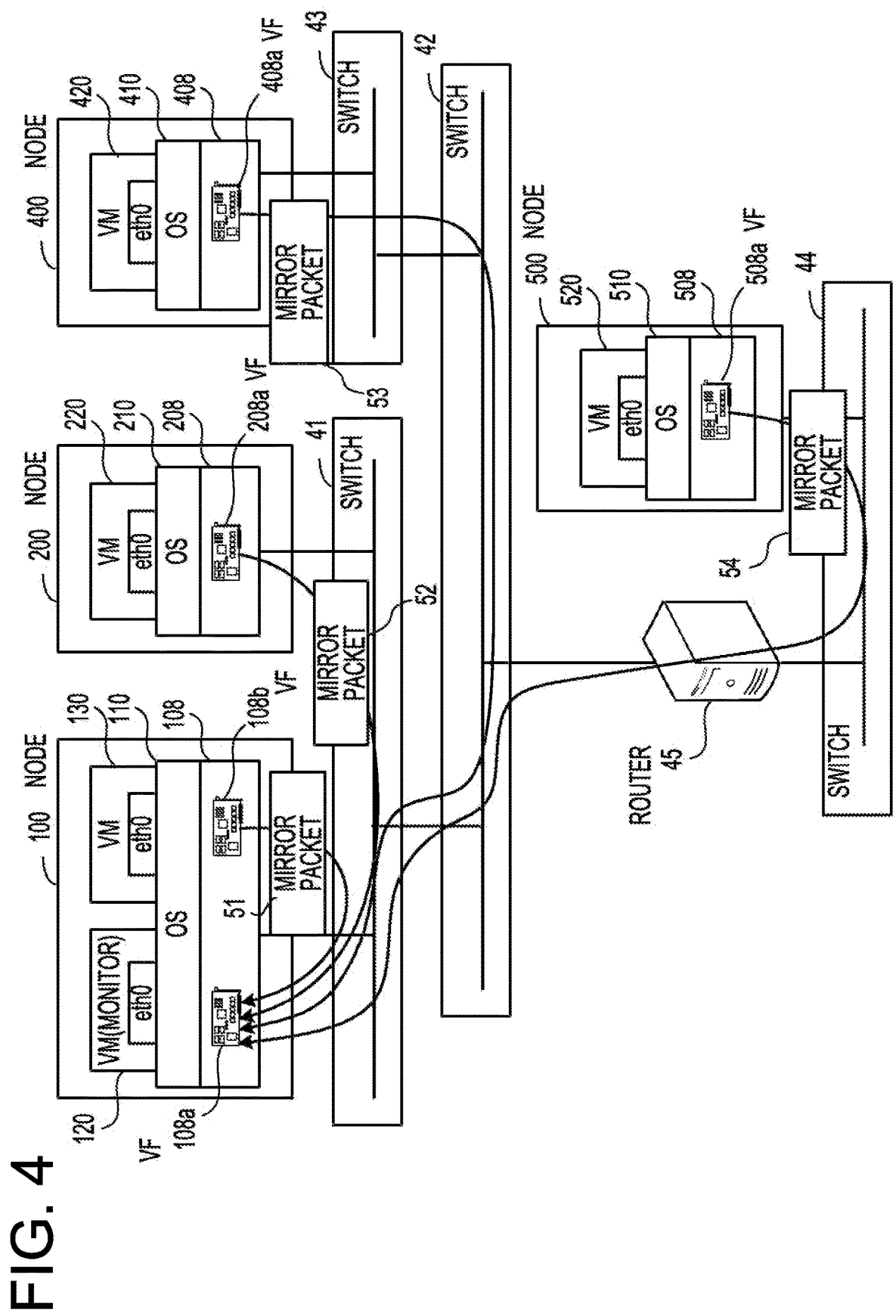
FIG. 4 is a view illustrating an example of a positional relationship between a monitoring VM and a monitoring target VM.

The setting contents of packet mirroring for the switches 41 to 44 depend on the positional relationship between a monitor VM and a management target VM. FIG. 4 is a view illustrating an example of the positional relationship between a monitoring VM and a monitoring target VM. An OS 110 and VMs 120 and 130 are operating on the node 100. The NIC 108 of the node 100 has VFs 108a and 108b that operate as virtual NICs, therein. The VFs 108a and 108b are allocated to the VMs 120 and 130, respectively. The VM 120 recognizes the allocated VF 108a as a network interface (eth0), and controls the VF 108a to conduct a communication. The VM 130 recognizes the allocated VF 108b as a network interface (eth0), and controls the VF 108b to conduct a communication.

An OS 210 and a VM 220 are operating on the node 200. The NIC 208 of the node 200 has a VF 208a that operates as a virtual NIC, therein. The VM 220 recognizes the VF 208a as a network interface (eth0), and controls the VF 208a to conduct a communication.

An OS 410 and a VM 420 are operating on the node 400. The NIC 408 of the node 400 has a VF 408a that operates as a virtual NIC, therein. The VM 420 recognizes the VF 408a as a network interface (eth0), and controls the VF 408a to conduct a communication.

An OS 510 and a VM 520 are operating on the node 500. The NIC 508 of the node 500 has a VF 508a that operates as a virtual NIC, therein. The VM 520 recognizes the VF 508a as a network interface (eth0), and controls the VF 508a to conduct a communication.

In the example of FIG. 4, the VM 120 is a monitoring VM (monitor). At this time, when a monitoring target is the VM 130, a mirror packet 51 of a packet transmitted/received by the VM 130 is transmitted to the VM 120 via the switch 41. When a monitoring target is the VM 220, a mirror packet 52 of a packet transmitted/received by the VM 220 is transmitted to the VM 120 via the switch 41. When a monitoring target is the VM 420, a mirror packet 53 of a packet transmitted/received by the VM 420 is transmitted to the VM 120 via the switches 41 to 43. When a monitoring target is the VM 520, a mirror packet 54 of a packet transmitted/received by the VM 520 is transmitted to the VM 120 via the switches 41, 42, and 44 and the router 45.

The transmission of the mirror packets 51 and 52 via only one switch 41 may be implemented by the setting of packet mirroring for the switch 41. The transmission of the mirror packet 53 via the plurality of switches 41 to 43 within the same segment may be implemented by the setting of VLAN for mirror packet transmission for the switches 41 and 43. The transmission of the mirror packet 54 via the router 45 or the L3 switch may be implemented by the setting of encapsulation of a mirror packet for the switch 44.

In this way, the setting contents of the switches 41 to 43 are different according to the positional relationship on the network between the monitoring VM 120 and the monitoring target VMs 130, 220, 420, and 520. In addition, while all the mirror packets 51 to 54 may be encapsulated and transmitted, the encapsulation of all the mirror packets 51 to 54 excessively increases the processing load of the switches 41 to 44. In other words, the load of the switches 41 to 44 for packet mirroring may be reduced by appropriately setting the switches 41 to 44 according to the positional relationship on the network between the monitoring VM 120 and the monitoring target VMs 130, 220, 420, and 520.

Figure 5:
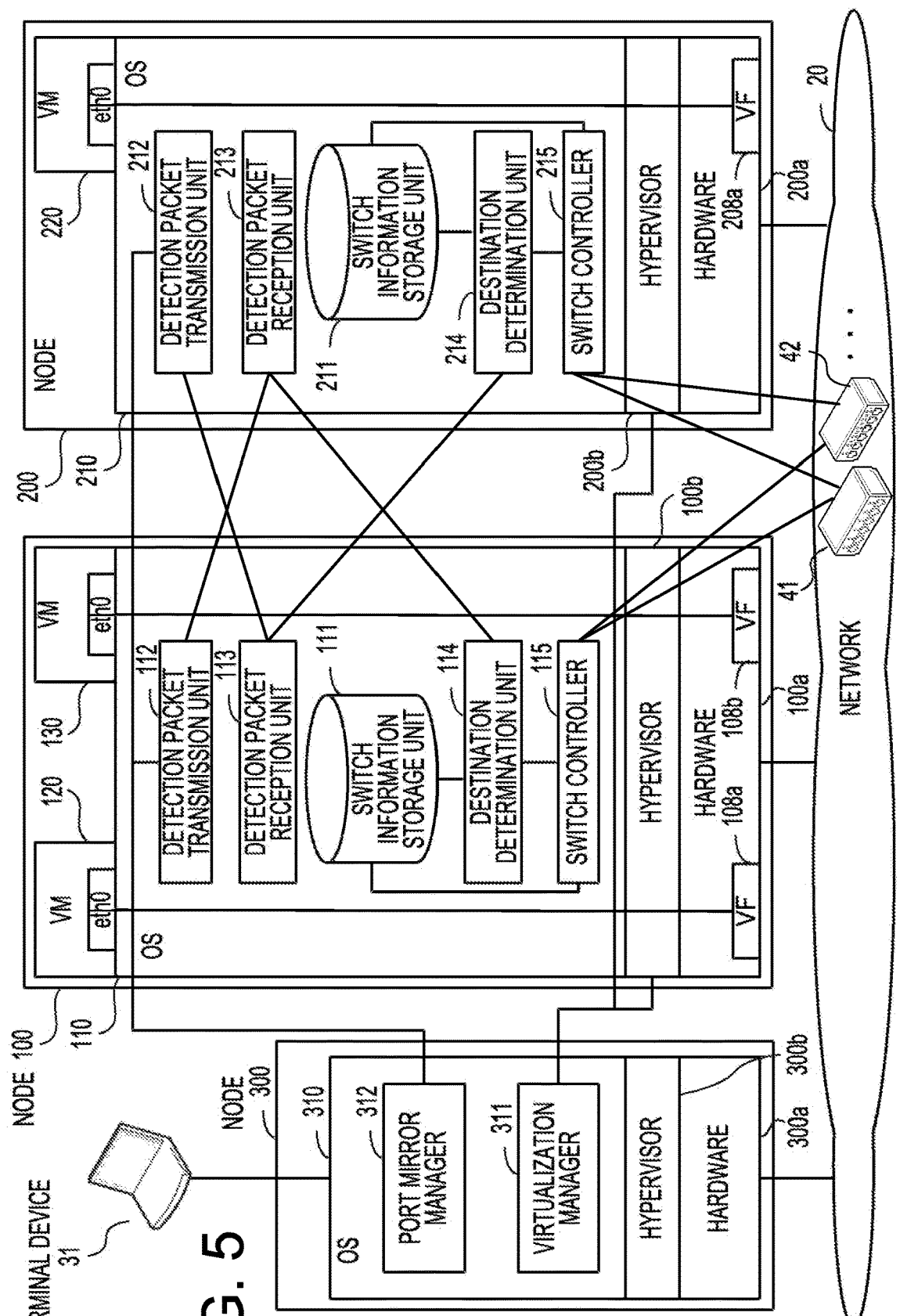
FIG. 5 is a block diagram illustrating an example of a function of a node.

Next, the function of each node for performing the packet mirroring setting will be described. FIG. 5 is a block diagram illustrating an example of the function of a node. In the example of FIG. 5, the node 300 is provided with a system management function, and the nodes 100 and 200 are provided with a service providing function using a VM.

The node 300 used for the system management manages the VMs 120, 130, and 220 of the nodes 100 and 200 according to a mirroring setting request from the terminal device 31 used by the administrator 30. In the node 300, for example, a hypervisor 300*b* is being executed by hardware 300*a*. Further, an OS 310 is being executed by the hypervisor 300*b*. In addition, the OS 310 may be directly executed by the hardware 300*a* without using the hypervisor 300*b*.

The OS 310 includes a virtualization manager 311 and a port mirror manager 312. The virtualization manager 311 manages the VMs 120, 130, and 220 that operate on the nodes 100 and 200. For example, when a generation of a new VM is instructed from the terminal device 31, the virtualization manager 311 instructs a node with a relatively low load to generate a VM. In addition, the virtualization manager 311 may instruct the nodes 100 and 200 to migrate a VM. For example, the virtualization manager 311 instructs a node having an excessive load to migrate a VM operating on the node to another node.

The port mirror manager 312 manages mirroring of a packet input/output to/from a specific VM. For example, when an instruction on a monitoring target VM is received from the terminal device 31, the port mirror manager 312 transmits a mirroring setting request for a packet input/output to/from the VM, to a node executing the VM.

The node 100 provides a service by the VMs 120 and 130. In the node 100, for example, a hypervisor 100*b* is being executed by hardware 100*a*. Further, the OS 110 and the VMs 120 and 130 are being executed by the hypervisor 100*b*. For example, the hypervisor 100*b* generates the VMs 120 and 130 in response to a VM generation instruction from the virtualization manager 311 of the node 300. Further, the hypervisor 100*b* receives a monitoring VM generation instruction from the virtualization manager 311, and when the generation of the VM is completed, the hypervisor 100*b* notifies the OS 110 that the VM is a monitoring VM. Further, the VMs 120 and 130 directly control VFs 108*a* and 108*b* which are allocated to the VMs 120 and 130, respectively, and conduct a communication via the network 20 without going through the OS 110 or the hypervisor 100*b*.

The OS 110 performs the management of the monitoring VM and the management of communication of the VMs 120 and 130 operating on the node 100. For example, the OS 110 performs the mirroring setting of a packet input/output to/from a specified VM of the VMs 120 and 130 according to a mirroring setting request from the port mirror manager 312 of the node 300. To this end, the OS 110 includes a switch information storage unit 111, a detection packet transmission unit 112, a detection packet reception unit 113, a destination determination unit 114, and a switch controller 115.

The switch information storage unit 111 stores information collected from the switches 41, 42, . . . that relay packets on the network 20. For example, a portion of a storage area of the memory 102 or the storage device 103 of the node 100 is used as the switch information storage unit 111.

When a mirroring setting request for a packet of a specific VM is received from the port mirror manager 312, the detection packet transmission unit 112 transmits a detection packet for detecting a VM having a monitoring function (destination VM) by broadcast within the same segment. For example, the detection packet transmission unit 112 transmits the detection packet by a broadcast frame in which all bits of the MAC address of the destination are set to "1." For example, an ARP (Address Resolution Protocol) request may be used as the detection packet.

The detection packet reception unit 113 receives a detection packet transmitted from another node 200 by broadcast. Then, when a VM on the node 100 on which the detection packet reception unit 113 is operating is a destination VM (a VM having a monitoring function), the detection packet reception unit 113 transmits a packet indicating Ack (acknowledgment) to the transmission source of the detection packet. When the detection packet is an ARP request, the detection packet reception unit 113 responds with an ARP reply.

When a response to the detection packet transmitted by the detection packet transmission unit 112 is returned from another node 200, the destination determination unit 114 receives the response packet. Then, the destination determination unit 114 determines the positional relationship between the monitoring target VM and the destination VM of the mirror packet according to the presence/absence of the response packet and the connection state of a reception port of the response packet received in the nearest switch. The destination determination unit 114 also refers to the information stored in the switch information storage unit 111 to determine the connection state of the reception port.

For example, when the Ack of the detection packet is returned, in a case where a port that has received the Ack packet is a "local port" of the nearest switch, the destination determination unit 114 determines that the destination VM is connected to the same switch as that of the node 100. In addition, when the Ack of the detection packet is returned, in a case where a port that has received the Ack packet is an "uplink port" of the nearest switch, the destination determination unit 114 determines that the destination VM is L2-connected across multiple switches. Further, when the time for waiting for the Ack of the detection packet is ended so that no Ack is returned, the destination determination unit 114 determines that the destination VM is L3-connected via the router 45.

The switch controller 115 manages the switches 41, 42, . . . . For example, the switch controller 115 collects internal information from the switches 41, 42, . . . and stores the collected internal information in the switch information storage unit 111. Further, the switch controller 115 performs the packet mirroring setting for the switches 41, 42, . . . based on the determination result obtained by the destination determination unit 114.

For example, when the destination VM is connected to the same switch as that of the node 100, the switch controller 115 performs a port mirroring setting for the switch. Specifically, the switch controller 115 sets a port to which the node having the destination VM is connected, as a monitor port, and sets a port to which the node 100 having the monitoring target VM is connected, as a mirror port.

In addition, when the destination VM is L2-connected across multiple switches, the switch controller 115 sets a mirroring VLAN for a switch to which the node 100 having the monitoring target VM is connected, and a switch to which the destination VM is connected. Specifically, for the switch 41 to which the node 100 having the monitoring target VM is connected, the switch controller 115 sets a port to which the node 100 is connected, as a mirror port. Further, the switch controller 115 sets the switch 41 to transmit a mirror packet of a packet input/output to/from the mirror port to an uplink port, with a mirroring VLAN_ID assigned to the mirror packet. In addition, the switch controller 115 sets a switch to which the node having the destination VM is connected, to transmit a VLAN packet having the mirroring VLAN_ID to a port to which the node is connected.

Furthermore, when the destination VM is L3-connected via the router 45, the switch controller 115 sets a switch to which the node 100 having the monitoring target VM is connected, to encapsulate an input/output packet of the monitoring target VM and transmit the encapsulated packet to the destination VM.

The node 200 provides a service by the VM 220. In the node 200, for example, a hypervisor 200b is being executed by hardware 200a. Further, the OS 210 and the VM 220 are being executed by the hypervisor 200b. The OS 210 includes a switch information storage unit 211, a detection packet transmission unit 212, a detection packet reception unit 213, a destination determination unit 214, and a switch controller 215. The functions of the elements in the node 200 are the same as the functions of the elements having the same names in the node 100.

In addition, the nodes 400 and 500 not illustrated in FIG. 5 have the same functions as those of the nodes 100 and 200. The lines that connect the elements to each other in FIG. 5 indicate a portion of communication paths, and communication paths other than the illustrated communication paths may be set. Further, the function of each element illustrated in FIG. 5 may be implemented, for example, by causing a computer to execute a program module corresponding to the element.

Figure 6:
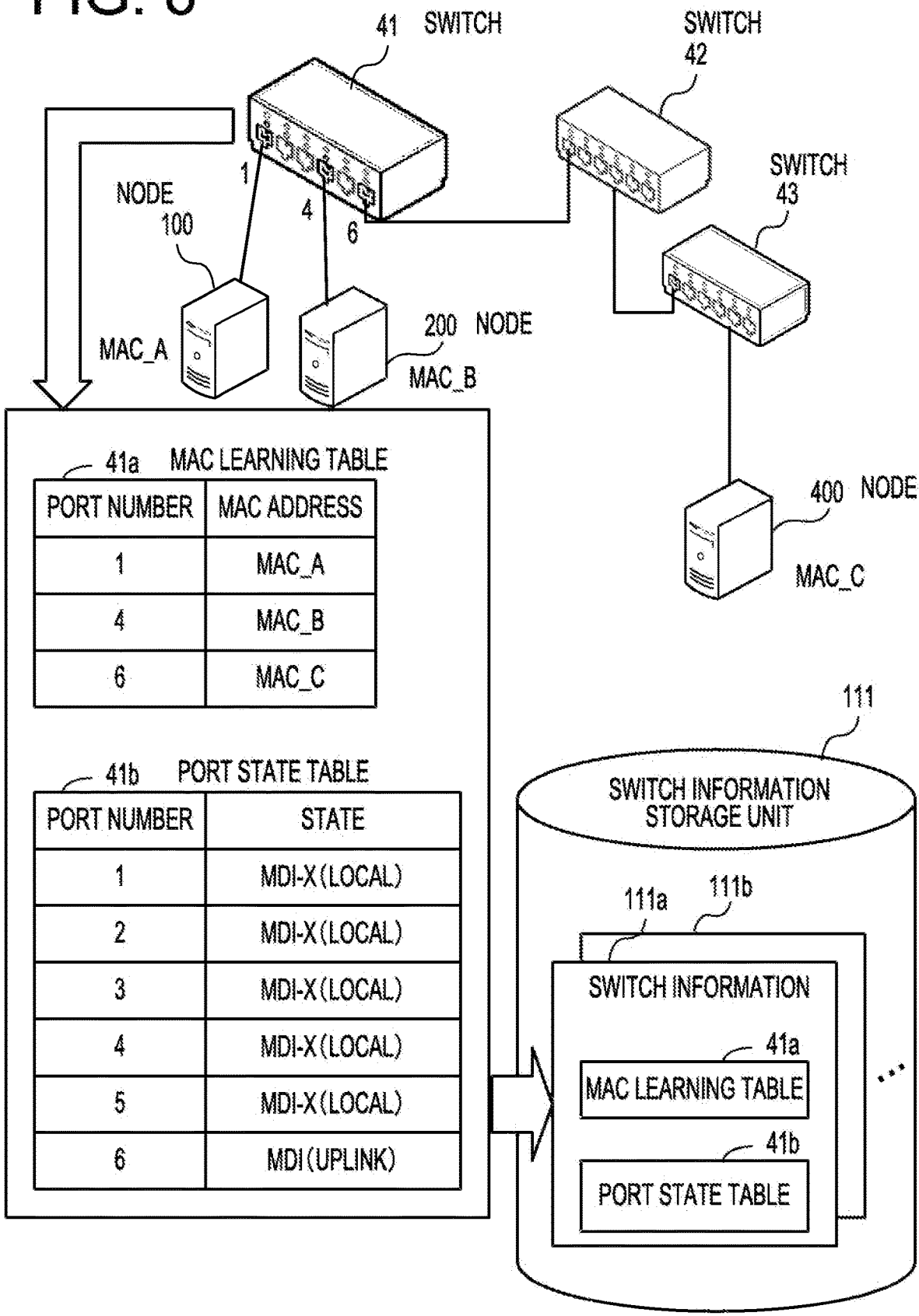
FIG. 6 is a view illustrating an example of information stored in a switch information storage unit.

Next, the information stored in the switch information storage unit 111 will be described. FIG. 6 is a view illustrating an example of the information stored in the switch information storage unit. The switch information storage unit 111 stores switch information 111a, 111b, . . . collected by the switch controller 115 from the switches 41 to 44, respectively. For example, the switch controller 115 of the node 100 acquires an MAC learning table 41a and a port state table 41b from the switch 41, and stores the acquired information in the switch information storage unit 111 as the switch information 111a.

In the MAC learning table 41a, MAC addresses of apparatuses that conduct a communication via ports of the switch 41 are set in association with port numbers of the ports. In the example of FIG. 6, the node 100 is connected to the port of the port number "1" of the switch 41, and the node 200 is connected to the port of the port number "4" of the switch 41. Further, the switch 42 is connected to the port of the port number "6" of the switch 41. The switch 43 is connected to the switch 42, and the node 400 is connected to the switch 43. In this case, in the MAC learning table 41a, an MAC address "MAC_A" of the node 100 is set in association with the port number "1." Further, an MAC address "MAC_B" of the node 200 is set in association with the port number "4." Further, an MAC address "MAC_C" of the node 400 is set in association with the port number "6."

In the port state table 41b, the connection states of the ports of the switch 41 are set in association with the port numbers of the ports. The port connection states include MDI-X (Medium Dependent Interface Crossover) for local ports and MDI (Medium Dependent Interface) for uplink ports. In the example of FIG. 6, the ports with the port numbers "1" to "5" are local ports, and the port with the port number "6" is an uplink port.

Here, in each of the nodes 100, 200, 400, and 500 that execute VMs, the NIC supports SR-IOV. When the port mirroring is performed in such an environment, it is difficult to easily grasp a node on which the monitoring VM is being executed. When the location of the monitoring VM is not grasped, a mirror packet may not be transferred correctly.

Further, in OpenFlow, all nodes are connected in a full mesh form through tunnels, and mirror packets are also transferred through the tunnels. In this case, a node having the monitoring target VM may transmit a mirror packet of a packet input/output to/from the monitoring target VM to all tunnel ports. For example, when a node having a monitoring VM receives the mirror packet, the node transmits a response packet to the transmission source of the mirror packet. Thereafter, the node having the monitoring target VM transmits the mirror packet only from the tunnel that has transmitted the response. In this way, when OpenFlow is used, mirror packets may be transmitted to the monitoring VM. However, OpenFlow may be applied under a condition that all switches are able to interpret the packets of OpenFlow. That is, in a network including a switch that does not correspond to OpenFlow, mirror packets may not be transmitted using OpenFlow.

Therefore, in the second embodiment, the nodes operate in cooperation with each other to identify a node having a monitoring VM without depending on OpenFlow, and a setting of a switch for transmitting a mirror packet to the node is performed.

Figure 7:
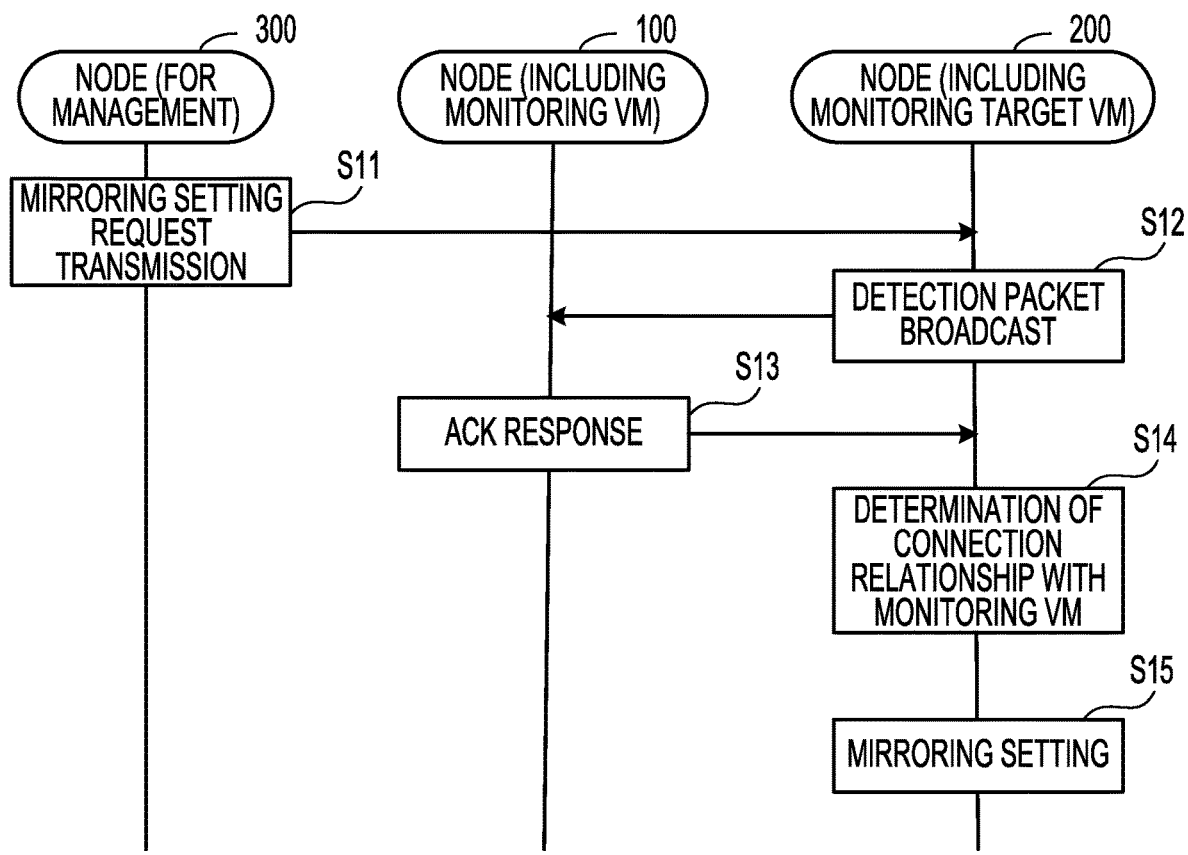
FIG. 7 is a sequence diagram illustrating an example of a linkage operation for mirroring setting.

FIG. 7 is a sequence diagram illustrating an example of the cooperative operation for mirroring setting. For example, it is assumed that there is a monitoring VM on the node 100 and port mirroring is performed with a VM on the node 200 as a monitoring target. The node 300 for system management transmits a mirroring setting instruction to the node 200 (operation S11). The node 200 that has received the mirroring setting request transmits a detection packet by broadcast within the same segment as that of the node 200, in order to search for the position of the monitoring VM (operation S12). The node 100 having the monitoring VM responds to the detection packet with Ack (operation S13). The node 200 determines the connection relationship with the monitoring VM, based on the presence/absence of the Ack response and the state of a port (a local port or an uplink port) that has received the Ack response (operation S14). Then, based on the determined connection relationship, the node 200 performs the mirroring setting for the switches 41 to 44 on the network (operation S15). The mirroring setting for the switches 41 to 44 may be performed, for example, by transmitting a control command to the switches 41 to 44.

Figure 8:
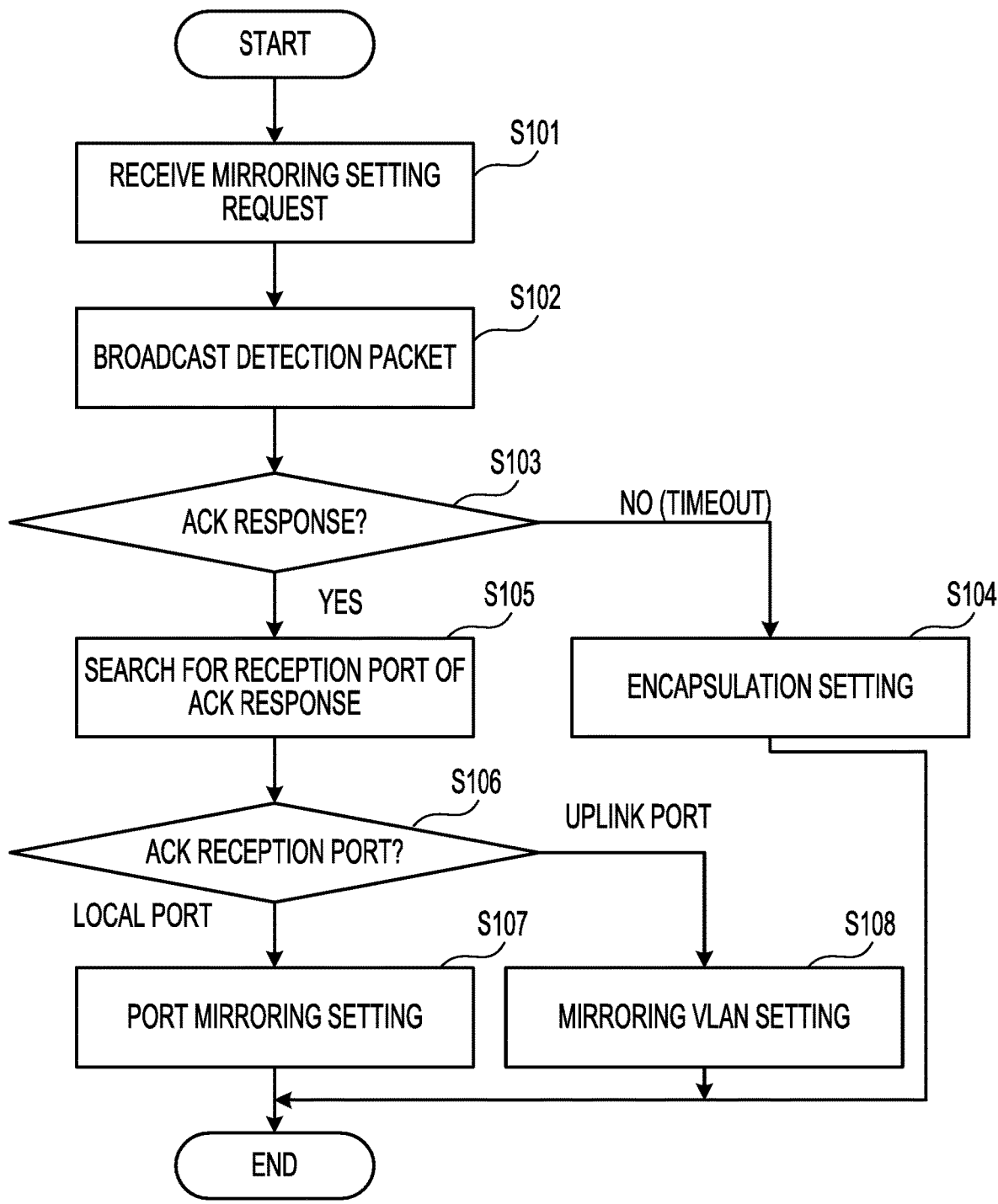
FIG. 8 is a flowchart illustrating an example of a procedure of a mirroring setting process.

Next, the procedure of the mirroring setting process by the node 200 will be described. FIG. 8 is a flowchart illustrating an example of the procedure of the mirroring setting process.

Hereinafter, the process illustrated in FIG. 8 will be described in accordance with operation numbers.

(Operation S101) The detection packet transmission unit 212 receives a mirroring setting request from the port mirror manager 312. The mirroring setting request includes, for example, an IP (Internet Protocol) address of a monitoring target VM and an IP address of a monitoring destination VM. The detection packet transmission unit 212 determines that a VM corresponding to an IP address indicated in the mirroring setting request is the monitoring target VM. In addition, the mirroring setting request may designate the traffic direction of a packet to be mirrored. For example, the mirroring setting request may designate either a packet input to the monitoring target VM or a packet output from the monitoring target VM, as a mirroring target.

When the detection packet transmission unit 212 receives the mirroring setting request, the switch controller 215 may update the switch information in the switch information storage unit 211 to the latest information. For example, when the reception of the mirroring setting request is detected, the switch controller 215 acquires switch information from each of the switches 41 to 44 and stores the acquired switch information in the switch information storage unit 211.

(Operation S102) The detection packet transmission unit 212 transmits a detection packet by broadcast. The detection packet is transmitted, for example, by a broadcast frame in which all bits of the MAC address of the destination are "1." In addition, the detection packet includes an identifier indicating the detection packet. The transmitted detection packet is transmitted to apparatuses within the same segment as that of the node 200 via the switches 41 to 43. The switch 41 also outputs the frame of broadcast transmission of the detection packet to a port to which the node 200 is connected.

(Operation S103) The destination determination unit 214 determines whether or not an Ack response to the detection packet transmitted by the detection packet transmission unit 212 has been received. When it is determined that the Ack response has been received, the destination determination unit 214 advances the process to operation S105. When the response waiting time is ended without receiving an Ack response, the destination determination unit 214 advances the process to operation S104.

(Operation S104) The destination determination unit 214 notifies the switch controller 215 that the destination VM is L3-connected via the router 45. The switch controller 215 sets the switch 41 connected to the node 200 to encapsulate a mirror packet of an input/output packet of the monitoring target VM and transmit the encapsulated mirror packet to the IP address of the destination VM. Thereafter, the switch controller 215 ends the mirroring setting process.

(Operation S105) The destination determination unit 214 searches for the state of the reception port of the received Ack response, based on the MAC learning table and the port state table of the switch 41. For example, the destination determination unit 214 refers to the transmission source address of the frame including the packet of the Ack response, to acquire the MAC address of the transmission source. Next, the destination determination unit 214 refers to the MAC learning table 41a of the switch 41, to acquire a port number in which the MAC address of the transmission source is registered. Further, the destination determination unit 214 refers to the port state table 41b, to acquire the state of the acquired port number.

(Operation S106) The destination determination unit 214 determines whether the reception port of the Ack response is a local port or an uplink port. When it is determined that the reception port is a local port, the destination determination unit 214 advances the process to operation S107. In addition, when it is determined that the reception port is an uplink port, the destination determination unit 214 advances the process to operation S108.

(Operation S107) The destination determination unit 214 notifies the switch controller 215 that the destination VM is a VM on a node connected to the same switch 41. The switch controller 215 performs the port mirroring setting for the switch 41. For example, the switch controller 215 sets a port to which the node 200 is connected, as a mirror port, for the switch 41. Further, the switch controller 215 sets a port to which a node executing the destination VM is connected (the reception port of the Ack response), as a monitor port, for the switch 41. Thereafter, the destination determination unit 214 ends the mirroring setting process.

(Operation S108) The destination determination unit 214 notifies the switch controller 215 that the destination VM is a VM on a node connected via multiple switches within the same segment. The switch controller 215 sets a mirroring VLAN. For example, the switch controller 215 sets the switch 41 to transmit a mirror packet of a port to which the node 200 is connected, to the uplink port, with a mirroring VLAN_ID assigned to the mirror packet. In addition, the switch controller 215 sets a switch to which a node having the destination VM is connected, to transmit a VLAN packet having the mirroring VLAN_ID to a port to which the node is connected.

In this way, an appropriate mirroring setting with the monitoring VM as destination VM is performed according to the connection relationship on a network between the monitoring target VM and the monitoring VM. As a result of the mirroring setting, the mirror packet of the input/output packet of the monitoring target VM is transmitted to the monitoring VM.

Figure 9:
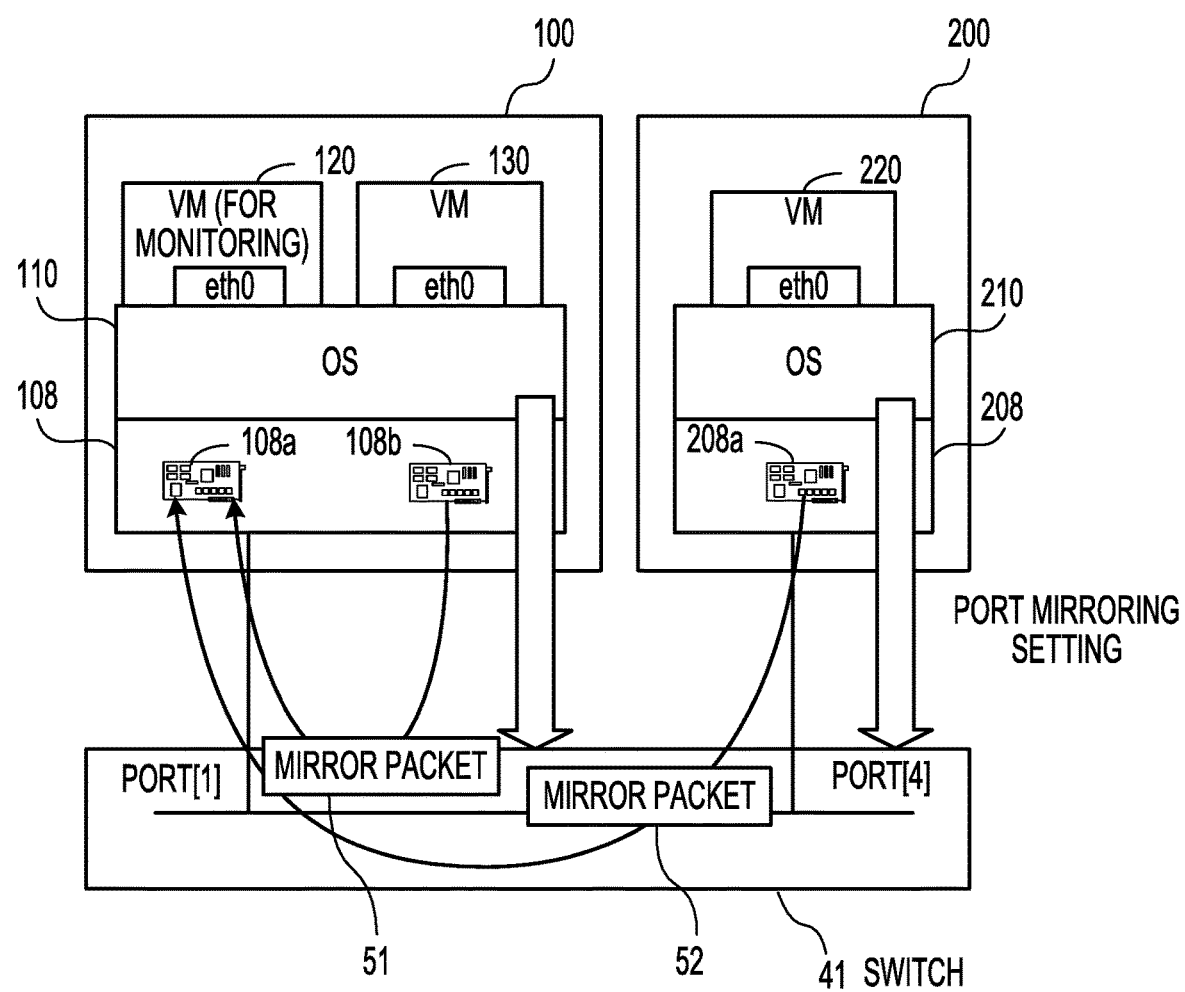
FIG. 9 is a view illustrating a first example of mirroring setting.

Hereinafter, descriptions will be made on an example of a transmission of a mirror packet based on the mirroring setting according to the positional relationship between the monitoring target VM and the monitoring VM with reference to FIGS. 9 to 11. FIG. 9 is a view illustrating a first example of the mirroring setting. In the example of FIG. 9, the VM 120 is the monitoring VM.

Here, for example, it is assumed that a mirroring setting request designating the IP address of the VM 130 as a monitoring target is input to the node 100. In this case, from the broadcast transmission of a detection packet, the OS 110 recognizes that the monitoring VM 120 is present in the same node 100 as that of the OS 110 (on the node 100 connected to the same port of the switch 41). In the example of FIG. 9, the connection port of the node 100 is the port with the port number "1" of the switch 41. In this case, the OS 110 sets the port of the port number "1" as a mirror port and a monitor port, for the switch 41.

Thereafter, the VM 130 conducts a communication using the VF 108b generated by the NIC 108. The VF 108b transmits or receives a packet via the port with the port number "1" of the switch 41. Then, the switch 41 generates the mirror packet 51 of the packet input/output via the port with the port number "1," and transmits the mirror packet 51 to the port with the port number "1." The transmitted mirror packet 51 is received by the VM 120 via the VF 108a.

In addition, when the mirror port and the monitor port are set to the same port, the mirror packets 51 and 52 are transmitted to the mirror port. The switch 41 suppresses mirroring for the mirror packets 51 and 52 transmitted to the monitor port. As a result, even when the mirror port and the monitor port are set to the same port, the mirror packet is not subject to mirroring.

Further, for example, it is assumed that a mirroring setting request designating, for example, the IP address of the VM 220 as a monitoring target is input to the node 200. In this case, from the broadcast transmission of a detection packet, the OS 210 recognizes that the monitoring VM 120 is present in the node 100 connected to the same switch 41 as that of the node 200. In the example of FIG. 9, the connection port of the node 100 is the port with the port number "1" of the switch 41, and the connection port of the node 200 is the port with the port number "4" of the switch 41. In this case, the OS 210 sets the port with the port number "1" as a mirror port and the port with the port number "4" as a monitor port, for the switch 41.

Thereafter, the VM 220 conducts a communication using the VF 208*a* generated by the NIC 208. The VF 208*a* transmits or receives a packet via the port with the port number "4" of the switch 41. Then, the switch 41 generates the mirror packet 52 of the packet input/output via the port with the port number "4," and transmits the mirror packet 52 to the port with the port number "1." The transmitted mirror packet 52 is received by the VM 120 via the VF 108*a*.

Figure 10:
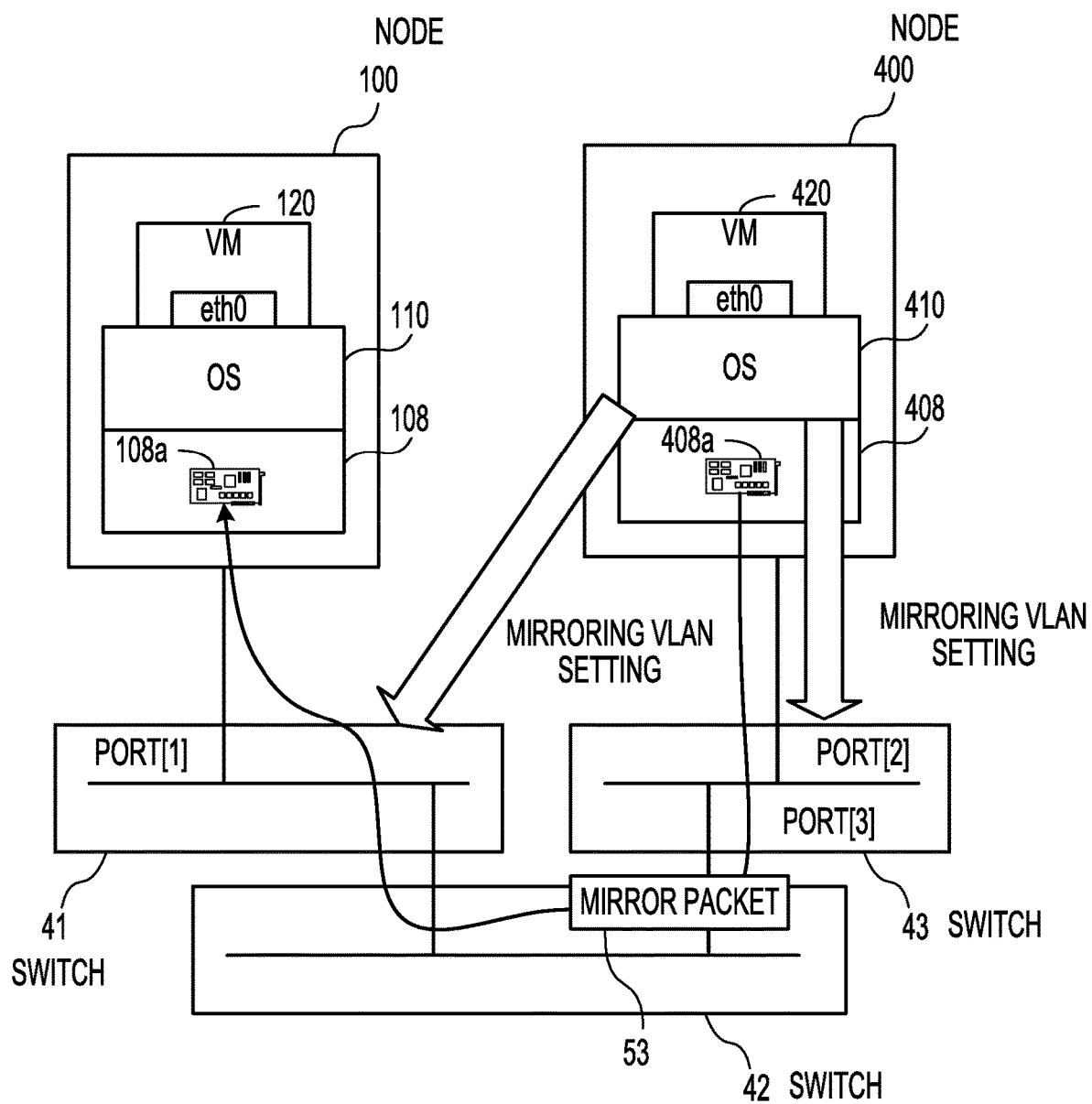
FIG. 10 is a view illustrating a second example of mirroring setting.

FIG. 10 is a view illustrating a second example of the mirroring setting. In the example of FIG. 10, the VM 120 is the monitoring VM. Further, for example, it is assumed that a mirroring setting request designating the IP address of the VM 420 as a monitoring target is input to the node 400. In this case, from the broadcast transmission of a detection packet, the OS 410 recognizes that the monitoring VM 120 is present in the node 100 connected via the plurality of switches 41 to 43. In the example of FIG. 10, the connection port of the node 100 is the port with the port number "1" of the switch 41. Further, the connection port of the node 400 is the port with the port number "2" of the switch 43. Further, the port with the port number "3" of the switch 43 is an uplink port, and the switch 42 is connected to the uplink port.

In this case, the OS 410 sets a mirroring VLAN for the switches 41 and 43. That is, the OS 410 defines a mirroring VLAN in the switches 41 and 43 and sets a VLAN_ID in the VLAN. Further, the OS 410 sets transmitting the mirror packet 53 of a packet input/output to/from the port number "2" of the switch 43 from the port with the port number "3" with the set VLAN_ID assigned to the mirror packet 53. Specifically, the OS 410 sets the port with the port number "2" of the switch 43 as a mirror port and defines a session for mirror packet transmission of a packet input/output to/from the mirror port. A mirroring VLAN_ID is set in the session. Then, the OS 410 sets in switch 43 the port with the port number "3" of the switch 43 as a reflector port of the transmission destination of the mirror packet 53 by the session. Further, the OS 410 sets transmitting the mirror packet 53 with the set VLAN_ID to the port number "1" of the switch 41. Specifically, the OS 410 defines a mirroring VLAN communication session for the switch 41. A mirroring VLAN_ID is set in the session. Then, the OS 410 sets the port with the port number "1" in the switch 41 as the destination port of a packet received in the session.

Thereafter, the VM 420 conducts a communication using the VF 408*a* generated by the NIC 408. The VF 408*a* transmits or receives a packet via the port with the port number "2" of the switch 43. Then, the switch 43 generates the mirror packet 53 of a packet input/output via the port with the port number "2," and transmits the mirror packet 53 from the port with the port number "3," with the VLAN_ID of the mirroring VLAN assigned to the mirror packet 53. The switch 42 transmits the received mirror packet 53 from all ports other than the reception port. When the mirror packet 53 is received, the switch 41 recognizes the mirror packet 53 based on the VLAN_ID, and transmits the mirror packet 53 from the port with the port number "1."

Figure 11:
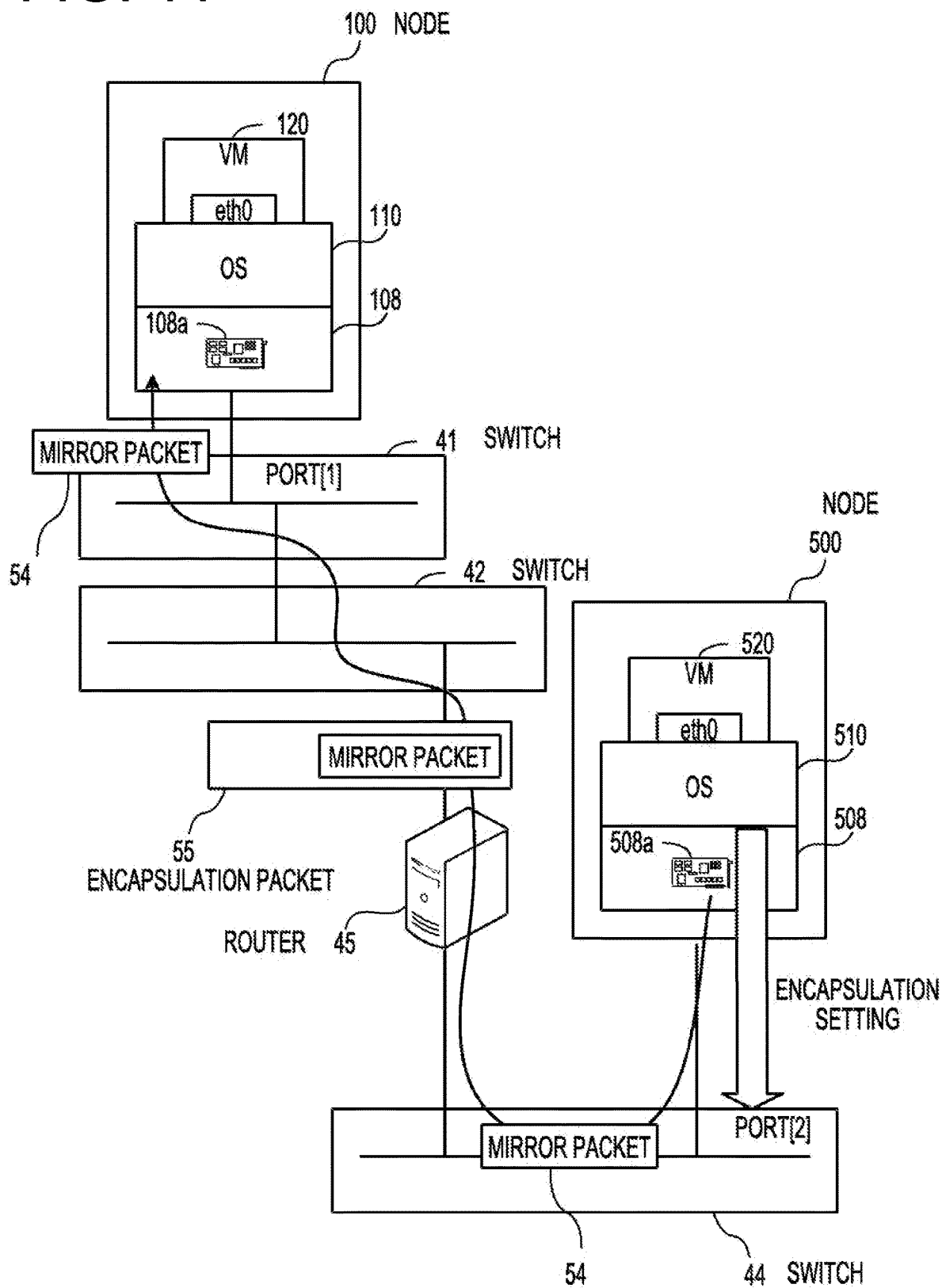
FIG. 11 is a view illustrating a third example of mirroring setting.

FIG. 11 is a view illustrating a third example of the mirroring setting. In the example of FIG. 11, the VM 120 is the monitoring VM. For example, it is assumed that a mirroring setting request designating the IP address of the VM 520 as a monitoring target is input to the node 500. In this case, from the broadcast transmission of a detection packet, the OS 510 recognizes that the monitoring VM 120 is present in the node 100 connected via the router 45. In the example of FIG. 11, the connection port of the node 100 is the port with the port number "1" of the switch 41. Further, the connection port of the node 500 is the port with the port number "2" of the switch 44.

In this case, the OS 510 sets the transmission by mirror packet encapsulation for the switch 44. That is, the OS 510 sets the switch 44 to encapsulate the mirror packet 54 of a packet input/output to/from the port with the port number "2." In addition, the OS 510 sets the IP address of the monitoring VM 120 as the destination of the encapsulated packet 55 generated by the encapsulation in the switch 44. Further, The OS 510 sets the session ID of a session used for the transmission of the encapsulated packet 55 generated by the encapsulation in the switch 44.

Thereafter, the VM 520 conducts a communication using the VF 508*a* generated by the NIC 508. The VF 508*a* transmits or receives a packet via the port with the port number "2" of the switch 44. Then, the switch 44 generates the mirror packet 54 of a packet input/output via the port with the port number "2," and encapsulates the mirror packet. Then, the switch 44 transmits the encapsulated packet 55 generated by the encapsulation with the IP address of the VM 120 as the destination. The encapsulated packet 55 is transferred to the switch 42 via the router 45. The switch 42 transmits the encapsulated packet 55 to the switch 41. When the encapsulated packet 55 is received, the switch 41 confirms that the IP address of the destination of the encapsulated packet 55 is the address of the node 100 connected to the switch 41 itself, and decapsulates the encapsulated packet 55. Then, the switch 41 transmits the mirror packet 54 obtained by the decapsulation to a port to which the node 100 with the IP address of the destination of the encapsulated packet 55 is connected.

In addition, the encapsulation of the mirror packet 54 may be performed using, for example, a protocol called GRE (Generic Routing Encapsulation). When GRE is used, the switch 41 that has received the encapsulated packet 55 may recognize that the packet is encapsulated for mirroring, by referring to the protocol type of a GRE header.

Figure 12:
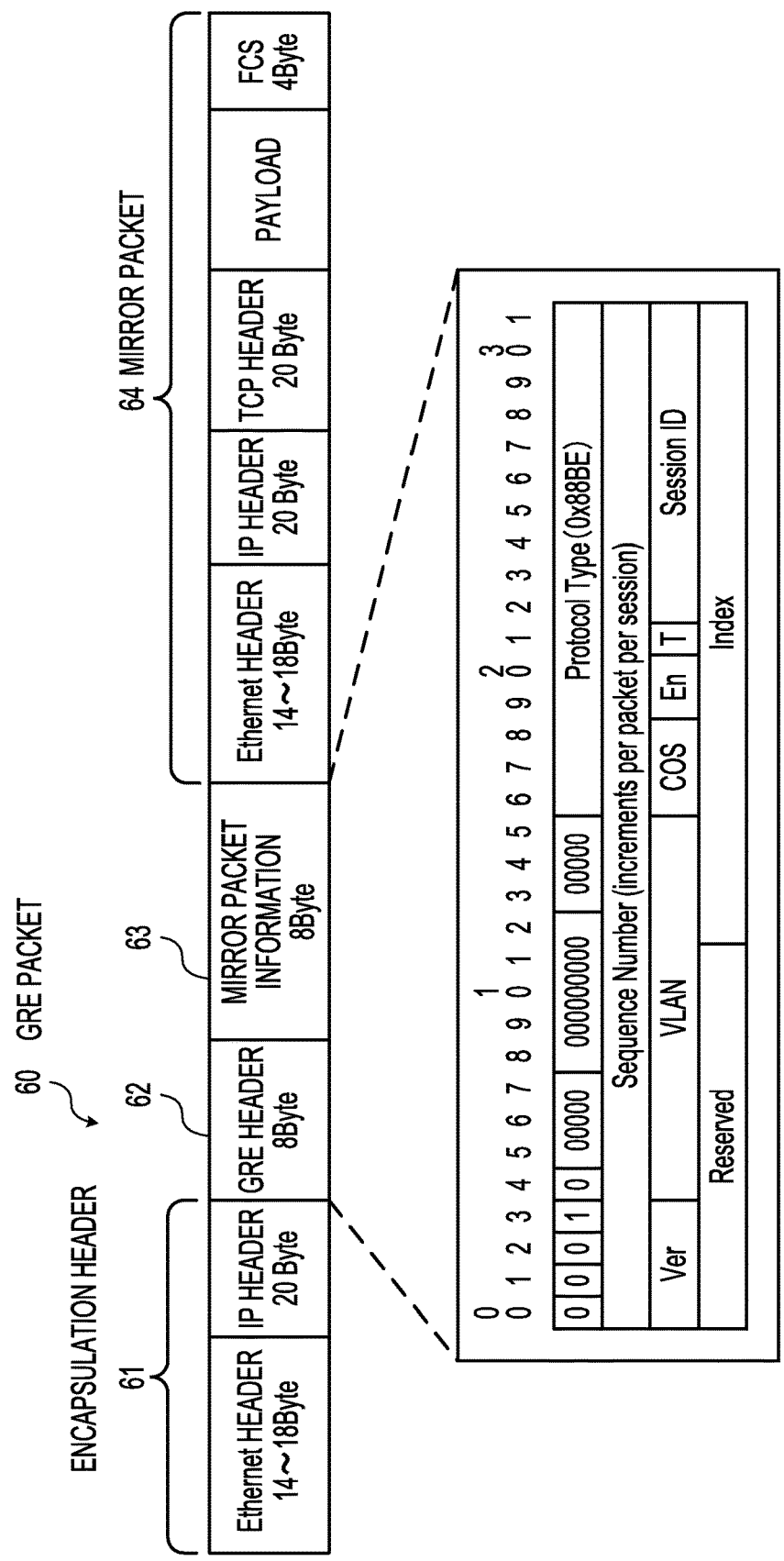
FIG. 12 is a view illustrating an example of a GRE packet format.

FIG. 12 is a view illustrating an example of the format of a GRE packet. The GRE packet 60 includes an encapsulation header 61, a GRE header 62, mirror packet information 63, and a mirror packet 64. The encapsulation header 61 includes an Ethernet® header and an IP header of the encapsulated packet. The GRE header includes information indicating the protocol type of the encapsulated packet. For example, when the protocol type is "0x88BE," the mirror packet 64 is encapsulated. When the GRE packet is received as the encapsulated packet 55, the switch 41 may recognize that the received encapsulated packet 55 includes the mirror packet 54, by confirming the protocol type indicated in the GRE header 62.

The mirror packet information 63 includes a session ID. The session ID is an ID of encapsulation mirroring designated by the switch 44 of the transmission source. The switch 41 releases the encapsulation when the destination IP address indicated in the encapsulation header 61 in the packet with the designated session ID is a node connected to the switch 41 itself.

In addition, the OS 510 may perform decapsulation setting in advance for the switch 41 that performs decapsulation. For example, the OS 510 sets the encapsulation session ID and the port number of a port of the transmission destination of the encapsulated mirror packet (a port to which the node 100 is connected) in the switch 41. In this case, when the encapsulated packet 55 to which the encapsulation session ID is assigned is received, the switch 41 decapsulates the encapsulated packet 55, and transmits the mirror packet 54, which is extracted from the encapsulated packet 55, to a preset port.

In this way, even when a mirror packet is transferred between switches that do not support OpenFlow, the mirror packet of a packet input/output to/from a VM conducting a communication in the SR-IOV environment may be correctly transmitted to a monitoring VM.

Other Embodiments

In the second embodiment, each of the nodes 100, 200, 400, and 500 other than the management node 300 is provided with a switch controller. However, the switch controller may be provided in at least one node. In this case, the destination determination unit of each of the nodes 100, 200, 400, and 500 notifies a determination result to a node having the switch controller via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 a memory configured to store, for each port of a switch of a plurality of switches included in a network, node identifier information to indicate a node identifier assigned to each apparatus of a plurality of apparatuses coupled via the port and state information to indicate a state of whether the port is a local port or an uplink port; and
 a processor coupled to the memory and the processor configured to:
 when a mirroring setting request for a communication packet of a virtual machine that operates in the information processing apparatus is received,
 transmit by broadcasting a detection packet to detect a monitoring node apparatus that includes a packet monitoring function;
 when a response packet to respond to the detection packet is received from the monitoring node apparatus,
 determine a state of whether a reception port that receives the response packet in the switch is a local port or an uplink port, based on the node identifier of the monitoring node apparatus, the node identifier information, and the state information;
 determine a connection relationship over the network between the information processing apparatus and the monitoring node apparatus, based on a presence/absence of the response packet and the determined state of the reception port; and
 perform a setting for transmitting a mirror packet obtained by copying the communication packet of the virtual machine to the monitoring node apparatus, for at least one switch of the plurality of switches, based on the determined connection relationship.

2. The information processing apparatus according to claim 1,
 wherein, when the response packet is received and the reception port is the local port, the processor is configured to determine that the monitoring node apparatus is coupled to the one switch.

3. The information processing apparatus according to claim 1,
 wherein, when the response packet is received and the reception port is the uplink port, the processor is configured to determine that the monitoring node apparatus is coupled within a same segment as the segment of the information processing apparatus via two or more switches.

4. The information processing apparatus according to claim 1,
 wherein, when the response packet is not received, the processor is configured to determine that the monitoring node apparatus is coupled to the information processing apparatus via a router.

5. An information processing system comprising:
 a monitoring node apparatus configured to monitor a communication packet over a network, and when a detection packet to detect the monitoring node apparatus is received, transmit a response packet to respond to the detection packet; and
 an information processing apparatus configured to include:
 a memory configured to store, for each port of a switch of a plurality of switches included in a network, node identifier information to indicate a node identifier assigned to each apparatus of a plurality of apparatuses coupled via the port and state information to indicate a state of whether the port is a local port or an uplink port, and
 a processor coupled to the memory and the processor configured to:
 when a mirroring setting request for the communication packet of a virtual machine that operates in the information processing apparatus is received,
 transmit by broadcasting the detection packet,
 when the response packet is received from the monitoring node apparatus,
 determine a state of whether a reception port that receives the response packet in the switch is a local port or an uplink port, based on the node identifier of the monitoring node apparatus, the node identifier information, and the state information,
 determine a connection relationship over the network between the information processing apparatus and the monitoring node apparatus, based on a presence/absence of the response packet and the determined state of the reception port, and
 perform a setting for transmitting a mirror packet obtained by copying the communication packet of the virtual machine to the monitoring node apparatus, for at least one switch of the plurality of switches, based on the determined connection relationship.

6. A non-transitory computer-readable recording medium storing a program that causes a computer to execute a procedure, the procedure comprising:

when a mirroring setting request for a communication packet of a virtual machine that operates in an information processing apparatus is received, transmitting by broadcasting a detection packet to detect a monitoring node apparatus that includes a packet monitoring function;

when a response packet to respond to the detection packet is received from the monitoring node apparatus, determining a state of whether a reception port that receives the response packet in a switch of a plurality of switches included in a network is a local port or an uplink port, based on a node identifier of the monitoring node apparatus, the node identifier being assigned to each apparatus of a plurality of apparatuses coupled via a port of the switch, node identifier information to indicate the node identifier, and state information to indicate a state of whether the port is a local port or an uplink port;

determining a connection relationship over the network between the information processing apparatus and the monitoring node apparatus, based on a presence/absence of the response packet and the determined state of the reception port; and performing a setting for transmitting a mirror packet obtained by copying the communication packet of the virtual machine to the monitoring node apparatus, for at least one switch of the plurality of switches, based on the determined connection relationship.

* * * * *